US006923411B2

(12) United States Patent
Chen et al.

(10) Patent No.: US 6,923,411 B2
(45) Date of Patent: Aug. 2, 2005

(54) ATTACHMENT DEVICE FOR PANEL WALLS

(75) Inventors: Peter Chen, West Windsor, NJ (US); Kevin Hui-Lien Lee, East Brunswick, NJ (US); Jungkun Lee, Edison, NJ (US)

(73) Assignee: Officemate International Corp., Edison, NJ (US)

( * ) Notice: Subject to any disclaimer, the term of this patent is extended or adjusted under 35 U.S.C. 154(b) by 1 day.

(21) Appl. No.: 10/702,672

(22) Filed: Nov. 6, 2003

(65) Prior Publication Data

US 2005/0098698 A1 May 12, 2005

(51) Int. Cl.[7] .................................................. F16L 3/08
(52) U.S. Cl. ...................... 248/222.41; D19/65; 24/13; 248/221.12; 248/309.2; 248/316.7
(58) Field of Search .......................... 248/312.1, 316.7, 248/309.2, 216.1, 217.3, 222.41, 222.21, 248/221.12, 22.52; D19/65; 40/668, 607.13; 24/6, 13, 317, 351, 363, 706.4, 707.7, 710.3

(56) References Cited

U.S. PATENT DOCUMENTS 162,171 A * 4/1875 Hubon .................... 248/216.1
1,336,692 A * 4/1920 Forman ........................ 24/358
5,269,485 A * 12/1993 Dwinell et al. .......... 248/216.4
D402,183 S 12/1998 Bellehumeur
6,126,126 A * 10/2000 McKiernan, Jr. ........ 248/217.3
D436,841 S 1/2001 Carpenter
D439,145 S 3/2001 Carpenter
6,325,345 B1 12/2001 Carpenter
6,443,409 B1 * 9/2002 Zanzucchi ............... 248/218.3
D478,628 S * 8/2003 Sheldon et al. .............. D19/65
2004/0026582 A1 * 2/2004 Brophy et al. .............. 248/214

* cited by examiner

*Primary Examiner*—Ramon O Ramirez
(74) *Attorney, Agent, or Firm*—Daniel Kirshner

(57) ABSTRACT

An attachment device for attaching office products or equipment to a panel wall that includes generally two elements: a locking member and at least one, and generally two, prong members. The locking member includes a base. Extended outward from the front face of the base is a key member for interaction with a keyhole on an office supply product. The key includes a stem portion and a knob portion and the stem portion is truncated so that the vertical dimension is smaller than the horizontal dimension. The key is inserted into the circular opening of a keyhole on an office supply product, is slid up into the slot portion of the keyhole and is then rotated 90° thereby locking the attachment device to the office product. The pins can be inserted into a panel wall thereby removeably attaching the office supply product to the panel wall.

5 Claims, 2 Drawing Sheets

ATTACHMENT DEVICE FOR PANEL WALLS

FIELD OF THE INVENTION

The present invention is an attachment device for attaching office products or other items to a cubicle or panel wall. More specifically, the present invention attachment device includes a pin member for connection to the wall and a key member for attachment to the keyhole of a piece of office supply equipment wherein said key has two distinct diameters.

BACKGROUND OF THE INVENTION

Many modern office places include panel walls to divide floor space into cubicles. Many office supply products or office equipment, such as paper sorters, picture frames, pencil cups, etc., include means for attachment to these panel walls. Various prior art attachment methods have been employed. Some prior art devices utilize double-stick tape to make such attachments. These devices that employ double-stick tape present the disadvantage of a weak attachment that is subject to failure, especially after the passage of time. Other devices employ simple pin or prong arrangements to stick the office product into the cubical wall. An example of a prior art device employing such a prong arrangement is shown in U.S. Design Pat. No. D439,145S by entitled Adhesive Back Hanger. Still other devices utilize magnetic or a variety of other methods of attaching the devices to the cubical walls.

It would be an advantage to provide a device for attachment to an office panel wall that is presents a strong, yet detachable attachment. It would also be a further advantage to provide such a device that can be interchangeably utilized with a wide variety of office products. Such are the objectives, advantages and novel features and structural elements presented by the invention disclosed herein. Other objectives and novel features, further scope of applicability of the present invention will be set forth in the detailed description to follow, taken in conjunction with the accompanying drawings, or may be learned by practice of the invention. The objectives and advantages of the invention may be realized and attained by means of the instrumentalities and combinations particularly pointed out in the appended claims.

SUMMARY OF THE INVENTION

The present invention is an attachment device for attaching office products or equipment to a panel or cubical wall. The attachment device includes generally two elements: a locking member and at least one, and generally two, prong members. The locking member includes a base. Extended outward from the front face of the base is a key member for interaction with a keyhole on an office supply product. The key includes a stem portion and a knob portion and the stem portion is truncated so that the vertical dimension is smaller than the horizontal dimension. The prong member has two parallel sharpened pins that extend out and down from the back face of the base. The key is inserted into the circular opening of a keyhole on an office supply product, is slid up into the slot portion of the keyhole and is then rotated 90° thereby locking the attachment device to the office product. The pins can be inserted into a panel wall thereby removeably attaching the office supply product to the panel wall.

DETAILED DESCRIPTION OF THE INVENTION

Figure 1:
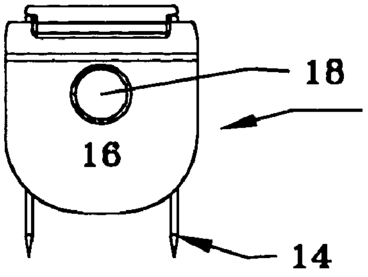
FIG. 1 is a front view of the present invention attachment device.

The present invention is an attachment device for attaching office supply products, equipment or other items to a panel wall of a cubical in an office or workplace. Referring to the figures, the present invention generally comprises two elements: a locking member 12 and a double-pronged fastening pin member 14.

The locking member 12 is formed from plastic or other rigid material and has a base portion 16 and an extending key portion 18 protruding from the base. Although the dimension and configuration of the base portion are generally not critical, the base portion of the embodiment shown has a top edge, two generally straight parallel side edges, and a curvilinear bottom edge. A ridge 20 traverses the back face of the base. The back face of the base extends first downward generally vertically, and then steps forward at the intersection with the ridge 20 so that the when the pins are vertical, the bottom of the base slopes forward.

Figure 1A:
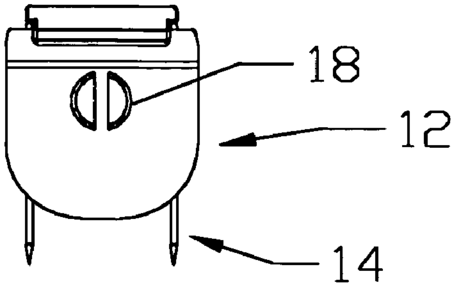
FIG. 1A is front view of one embodiment of the present invention attachment device showing the split key member.
Figure 2:
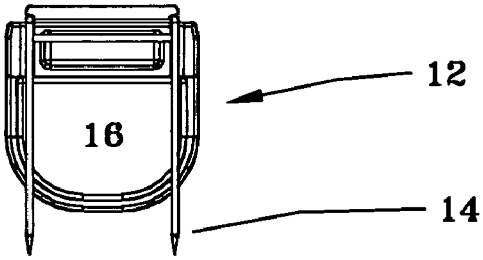
FIG. 2 is a back view of the present invention attachment device.
Figure 3:
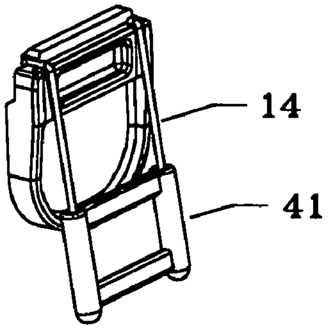
FIG. 3 is a perspective view of the present invention attachment device showing the pin guard in place.
Figure 5:
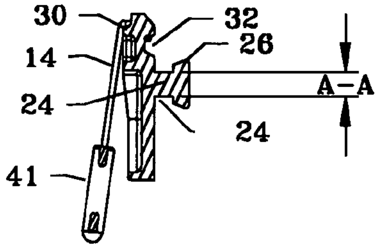
FIG. 5 is a side cross-sectional view of the present invention attachment device showing the pin guard in place.

Extending from the front face of the base portion is an extending key portion 18 which is best viewed in the side cross-sectional viewed seen in FIG. 5. The key portion includes a stem portion 24 that extends outward in a direction that is substantially perpendicular to the base portion. Attached to the stem portion is a knob portion 26, said knob portion being formed a disc where diameter of the front edge is somewhat larger than the diameter of the back edge. In other words, knob portion is a disc shaped with a side wall that slants inward as best shown in FIG. 5. In one embodiment of this invention, the key portion includes a vertical split that separates both the knob portion and the stem portion into two distinct regions as seen in FIG. 1A.

Figure 6:
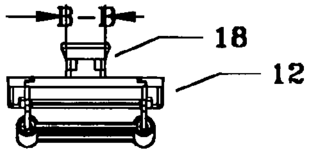
FIG. 6 is a top view of the present invention attachment device showing the pin guard in place.

An important aspect of the present invention is the click and lock feature of the attachment device. Specifically, the stem portion 24 is formed as a cylinder with its top edge and the bottom edge truncated, as seen best in FIG. 5. As such, it will be understood that the top to bottom cross-sectional diameter A—A as shown in FIG. 5 will be smaller than the side to side cross-sectional diameter B—B as shown in FIG. 6. Thus, a first predetermined distance is chosen for the side to side diameter B—B. Thereafter, by truncating the cylinder of the stem on its top and bottom, a second predetermined diameter A—A is chosen.

Figure 4:
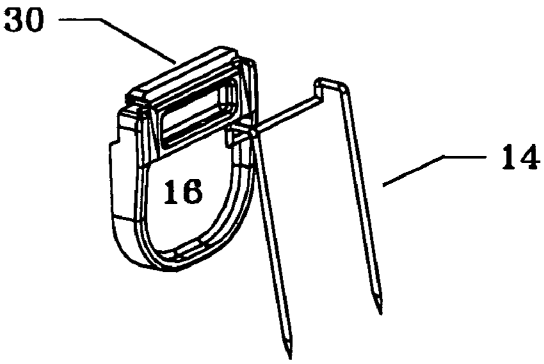
FIG. 4 is an exploded perspective view of the present invention attachment device.

Referring to FIG. 4 in conjunction with FIG. 5, a pin attachment flange 30 extends from the top of front face of the base portion 16. The pin attachment flange has a width that is less than the entire width of the base portion as seen best in FIG. 1. More specifically, the flange extends vertically upward from the base portion. Then the flange extends horizontally outward to the approximate point of the front of the base. Next, the flange extends downward so that the front of the flange and its side slant toward the middle. Next, the flange extends vertically downward flush with the front of the base and then extends horizontally inward. As seen in FIG. 5, just below the pin attachment flange there is a groove 32 that extends from one side to the other of the base.

A double-pronged fastening pin member 14 is provided which is best seen in the exploded view of FIG. 4. The pin is a single wire that is bent so that it includes two parallel sharpened needles of equal length. (Of course, it is well within the scope of this disclosure to include a pin that has one, or more than two sharpened needles.) As seen in FIG. 4, the double-pronged pin is bent is such a manner to have a configuration that mates with the pin attachment flange 30. Specifically, the pin is bent in such a way as to cooperate with the flange, i.e. has a mating configuration and dimensions just slightly larger than the flange. Thus, the pin is attached to the base portion by snapping it in place over the attachment flange 30 thereby locking it into place with its horizontal aspect residing in the groove 32. As shown, once the pin is attached to the base, the two prongs of the pin extend outward and downward from the top of the back face of the base. In addition, the needles abut against the ridge 22, thereby allowing the pins to flex at the abutment point. Other means of attachment of the pin the back of the base may be utilized.

Figure 7:
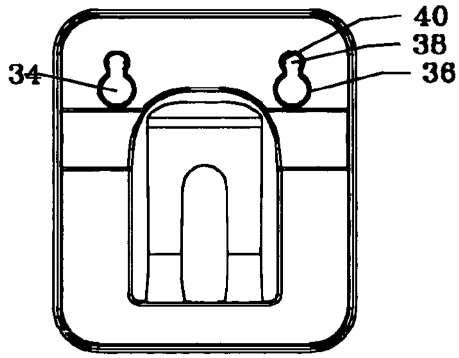
FIG. 7 is a back view of a paper holder showing the keyhole that interacts with the key portion of the present invention.

The attachment device of the present invention interacts with any number of office supply products for mounting on a cubical wall. An example of such of device is depicted in FIG. 7 which is a back view of a paper sorter for wall mounting. It is understood that the attachment device can be utilized on a wide variety of other products such as paper clip holders, pencil cups, etc.

On the back face of the office supply product is disposed at least one keyhole 34. The keyhole comprises an opening that includes a first, generally circular region 36. Atop the first circular region is a slot 38, said slot rounded at its top and tapering inward until it meets with the circular region. As can be seen in the figure, the side-to-side dimension of the slot is smaller that the diameter of the circular region. However, the side-to-side dimension of the slot should be somewhat larger that the top to bottom (the truncated) dimension of the stem of the key portion, and should be approximately equivalent to the side to side (non-truncated) dimension. Extending inward from both walls of the slot is a locking flange 40.

The attachment device of the present invention is employed in the following manner. The key portion 18 of the attachment device is inserted into the circular region of the keyhole 36. In order to slide the key portion up into the slot, the attachment device must be rotated 90° so that the attachment device has the fastening pins in a horizontal orientation (i.e. the smaller, truncated faces of the stem of the key are now vertical.) The key is slid up into the slot 38 of the keyhole. Finally, the attachment device is rotated back 90° so that it is again upright with the point of the pins facing down. This engages the click and lock mechanism of the invention. In other words, by rotating the attachment device, the larger, non-truncated width of the stem portion interacts with the slot (more specifically, the flanges 40) thereby compressing together the two hemispheres of the key and thus locking the attachment device into the keyhole. The attachment device is secured in place and can not be removed from the slot until the attachment device is again rotated 90° thereby unlocking the click and lock mechanism and allowing the key to be slid downward out of the slot and into the circular region of the keyhole for removal.

A pin guard 41 is provided with the present invention which pin guard is a plastic guard to cover the sharpened pins of the present invention. Of course, the pin guard is not integral to the device, is merely for safety purposes and must be removed before employment of the attachment device.

Figure 8:
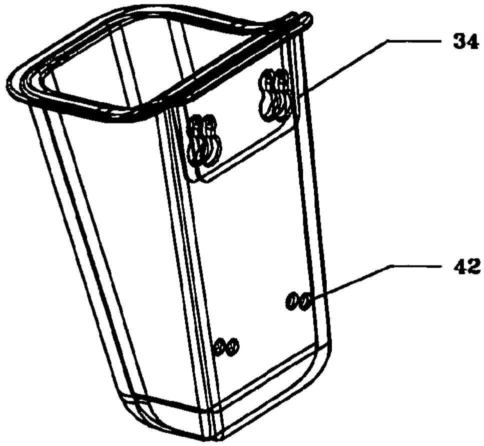
FIG. 8 is a side perspective view of a pencil cup showing the keyhole and showing the spacing dots.

Depending on the size and configuration of the office product that is to be mounted to the panel, it may be advantageous to add spacers to the side of the product that abuts the wall. Dot spacers 42 are shown in FIG. 8 on a pencil cup. The dot spacers are dots of plastic which extend outward from the back of the office supply product to space it away from a wall. The selection of whether or not to employ dot spacers on the office product is based on the configuration of the office product and it interaction with the wall. Specifically, dot spacers will be utilized if the conditions require them in order for the product to be positioned substantially flat on the wall.

It is clear that the attachment device of the present invention is interchangeable. That is, the same assembly for attachment to a cubical wall can be employed with any piece of equipment or office product that includes the appropriate key hole arrangement. Thus, the present invention presents an interchangeable attachment device that securely locks the office product to the wall when desired, and yet through its click and lock mechanism is easily detachable. Furthermore, a variety of office products may be supplied with the appropriate keyhole and thereby utilized with the click and lock mechanism of the present invention.

Finally, the present invention can be utilized with cubical walls, dry wall through selection of the appropriate attachment assembly. The fastening pins may be removed and replaced with alternative attachments. In order to remove the fastening pins, the plastic body is held tightly, and the fastening pins are rotated 90°, and the pins are pushed in a downward direction. Now the fastening pins may be replaced with a magnet for attachment to a magnetically attractive structure or may be replaced with screw brackets for attachment to a wall formed from dry wall or the like. It will be appreciated that the click and lock mechanism of the present invention can still be utilized in such an arrangement.

The foregoing in considered as illustrative only of the principles and preferred embodiment of the invention. Furthermore, since numerous changes and modifications will readily occur to one skilled in the art, it is not desired to limit the invention to the exact construction, operation and embodiment shown and described, and accordingly all suitable modification and equivalents may be resorted to, falling within the scope of the invention.

What is claimed:

1. An attachment device attaching a piece of equipment to a panel wall comprising:

a. said attachment device including a locking member, said locking member including a base having a front and a back face, a key portion extending from said front face of said base, said key portion including a knob portion and a stem portion, wherein said stem portion has a first predetermined diameter and a second predetermined diameter;

b. at least one fastening pin attached to the back face of said base said at least one fastening pin for insertion into a wall; and c. a piece of equipment, said equipment including a keyhole whereby said key portion is connected to said piece of equipment by insertion of said key into said keyhole on said piece of equipment and rotating said attachment device.

2. The attachment device of claim 1 wherein said first predetermined diameter is in a horizontal direction and said second predetermined diameter is in a vertical direction and is smaller than said first predetermined diameter.

3. The attachment device of claim 1 wherein said at least one pin is two substantially parallel pins.

4. The attachment device of claim 1 wherein said knob includes a split that splits said knob into two regions.

5. The attachment device of claim 4 wherein said split is oriented vertically.

* * * * *